United States Patent [19]
Tayag

[11] Patent Number: 5,640,474
[45] Date of Patent: Jun. 17, 1997

[54] EASILY MANUFACTURABLE OPTICAL SELF-IMAGING WAVEGUIDE

[75] Inventor: Tristan Tayag, Catonsville, Md.

[73] Assignee: The United States of America as represented by the Secretary of the Army, Washington, D.C.

[21] Appl. No.: 536,909

[22] Filed: Sep. 29, 1995

[51] Int. Cl.⁶ .................................................. G02B 6/00
[52] U.S. Cl. ............................................................. 385/43
[58] Field of Search ........................ 385/40–48, 129, 385/147

[56] References Cited

U.S. PATENT DOCUMENTS

| | | | |
|---|---|---|---|
| 3,756,688 | 9/1973 | Hudson et al. | 385/43 |
| 4,438,447 | 3/1984 | Copeland, III et al. | 385/14 X |
| 5,208,882 | 5/1993 | Strasser et al. | 385/43 X |
| 5,428,698 | 6/1995 | Jenkins et al. | 385/46 X |

*Primary Examiner*—Akm E. Ullah
*Attorney, Agent, or Firm*—Freda L. Krosnick; Frank J. Dynda

[57] ABSTRACT

An optical waveguide device based on the self-imaging (Talbot) effect is disclosed. An induced mode index difference between the device's multimode propagation (MMP) region and its surrounding host region forms a total internal reflection (TIR) interface. A pair of TIR interfaces result in lateral waveguide mode confinement and self-imaging formation. Also disclosed is an improved method of manufacturing the waveguide device.

21 Claims, 9 Drawing Sheets

EASILY MANUFACTURABLE OPTICAL SELF-IMAGING WAVEGUIDE

TECHNICAL FIELD

This invention relates to optical waveguide devices, and more particularly, to optical waveguide devices that are based on the self-imaging (Talbot) effect.

BACKGROUND ART

Optical beamsplitting forms a critical function in a variety of applications such as antenna remoting, cable television distribution, and telecommunications. In each of these areas, the input and outputs to the splitting device typically consist of optical fibers. A Y-branching tree of fused fiber splitters is sufficient for small numbers of splitters, N. For $N \geq 15$, however, fused fiber splitters are impracticable and fiber-pigtailed integrated optical splitters appear more viable. Desired characteristics of integrated optical (IO) beamsplitters include robustness in fabrication tolerance, ease of manufacture, fabrication techniques implementable in a variety of material systems, insensitivity to polarization, uniformity in splitting ratios, low insertion loss, and compact size.

Previous designs of IO beamsplitters used cascaded Y-junction branches or evanescent field couplers. More recently, computer-generated waveguide holograms, radiative power splitters, and self-imaging beamsplitters have been demonstrated.

Self-imaging in planar optical waveguides was first demonstrated by Ulrich and Ankele in "Self-imaging in Homogeneous Planar Optical Waveguides," *Appl. Phys. Lett.*, Vol. 27, p. 337–39 (1975). In this early demonstration, self-imaging was demonstrated along the transverse dimension of the waveguide with both the transverse and lateral dimensions of the guide supporting multiple modes. The waveguide consisted of an immersion fluid sandwiched between a pair of fused quartz plates. More practical self-imaging beamsplitters have been demonstrated in semiconducting material systems by J. M. Heaton, R. M. Jenkins, D. R. Wight, J. T. Parker, J. C. H. Birbeck, and K. P. Hilton, in "Novel 1-to-N Way Integrated Optical Beam Splitters Using Symmetric Mode Mixing in GaAs/AlGaAs Multimode Waveguides," *Appl. Phys. Lett.*, Vol. 61, p. 1754–56 (1992), and by A. Ferreras, F. Rodrigues, E. Gomex-Salas, J. L. deMiguel, and F. Hernandez-Gil in "Design and Fabrication of a InP/InGaAsP multimode power splitter," in 1993 *Tech. Dig., Integrated Photonic Research*, Vol. 10, paper IME4, Palm Springs, 1993. Both devices use reactive ion etching (RIE) to etch deep vertical sidewalls completely through the guiding layer of a slab waveguide, thus forming the requisite total internal reflective sidewalls between the etched and unetched regions of the waveguide in the multimode propagation region of the device.

The use of RIE to etch deep vertical sidewalls through the entire guide layer of the slab waveguide results in a number of drawbacks. First, etching through the guide layer increases both the device insertion loss and polarization crosstalk due to scattering from the sidewall roughness. Insertion loss in these devices is typically calibrated with respect to an adjacent channel waveguide fabricated with the same process. The reported insertion loss values therefore are somewhat conservative, since a significant amount of the insertion loss is attributable to the adjacent channel waveguides themselves. Second, it is very difficult to fabricate deep vertical sidewalls in important waveguide material systems such as $LiNbO_3$ and $LiTaO_3$. The highest reported etch rate selectivity between $LiNbO_3$ and a metal mask is about 10:1 using low pressure $CF_4$ planar sputter etching. For the required etch depths of about 3 µm, vertical sidewalls are difficult to achieve due to mask edge erosion.

It is accordingly an object of the invention to provide an improved optical self-imaging waveguide device having a total internal reflection interface between the device's multimode propagation region and its surrounding host region which results in the following advantages:

(a) low device insertion loss;

(b) low polarization crosstalk, (c) ease of manufacture, and (d) application to diverse waveguide material systems.

Another object of the present invention is to provide an improved method of manufacturing an optical self-imaging waveguide device which can be adapted for use on a variety of waveguide material systems.

DISCLOSURE OF THE INVENTION

These and other objects are achieved by the optical self-imaging waveguide device and the method of manufacturing the device of the present invention.

An optical self-imaging waveguide device, according to the present invention, comprises an input waveguide region, a multimode propagation region, and an output region consisting of an array of waveguides. Each of these regions consists of a single mode transverse guide structure surrounded on either side by a host structure of a lower mode index than the guide structure forming an induced mode index difference. Each of the three regions contains the same transverse waveguide structure. Along the lateral directions of each of the three regions, the interface between the guide and host structures is formed by a tapered mode index profile. The tapered profile is constant along the mode propagation direction to result in total internal reflection at the interface.

Preferably, the input waveguide is single mode in both the transverse and lateral directions, each element of the output waveguide array is single mode in both the transverse and lateral directions, and the multimode propagation region is single mode in the transverse direction and multimode in the lateral direction only.

The induced mode index difference may be formed by partially etching the host structures, or by overlay clad loading the guide structures, or by indiffusion of the guide structures and/or the host structures, or by ion exchange of the guide structures and/or the host structures.

The device of the present invention may be formed of any of the following materials: lithium niobate or lithium niobate-based, lithium tantalate or lithium tantalate-based, galium arsenide or galium arsenide-based, indium phosphide or indium phosphide-based, glass, silica-based or polymer-based.

Preferably, the input waveguide symmetrically feeds the multimode propagation region.

According to another aspect of the present invention, a method of manufacturing an optical self-imaging waveguide device is disclosed. The method comprises the steps of forming a device including a single mode input waveguide symmetrically feeding a multimode propagation region followed by an output waveguide array, each of the input waveguide, the multimode propagation region, and the output waveguide array including a guide structure, a host structure, and a tapered region therebetween. A mode index difference is induced between the mode index of the guide structure and the mode index of the host structure.

Preferably, the step of inducing a mode index difference comprises partially etching the host structures.

Alternatively, the step of inducing a mode index difference comprises overlay clad loading of the guide structures.

Also alternatively, the step of inducing a mode index difference comprises indiffusion of the guide structures and/or the host structures.

Another alternative is that the step of inducing a mode index difference comprises ion exchange of the guide structures and/or the host structures.

BEST MODE FOR CARRYING OUT THE INVENTION

Figure 1:
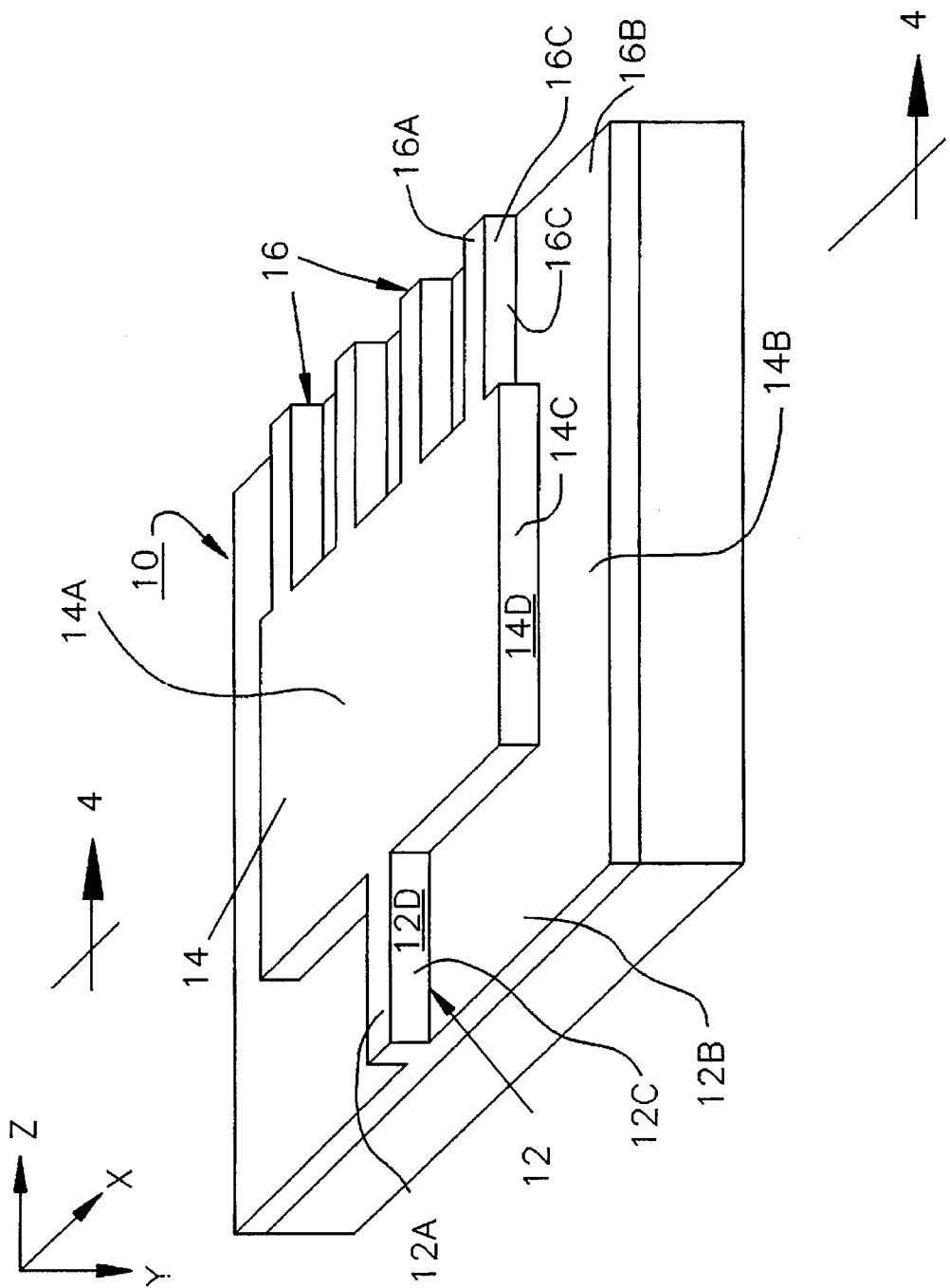
FIG. 1 is a perspective view of a waveguide beamsplitter according to the present invention.
Figure 2:
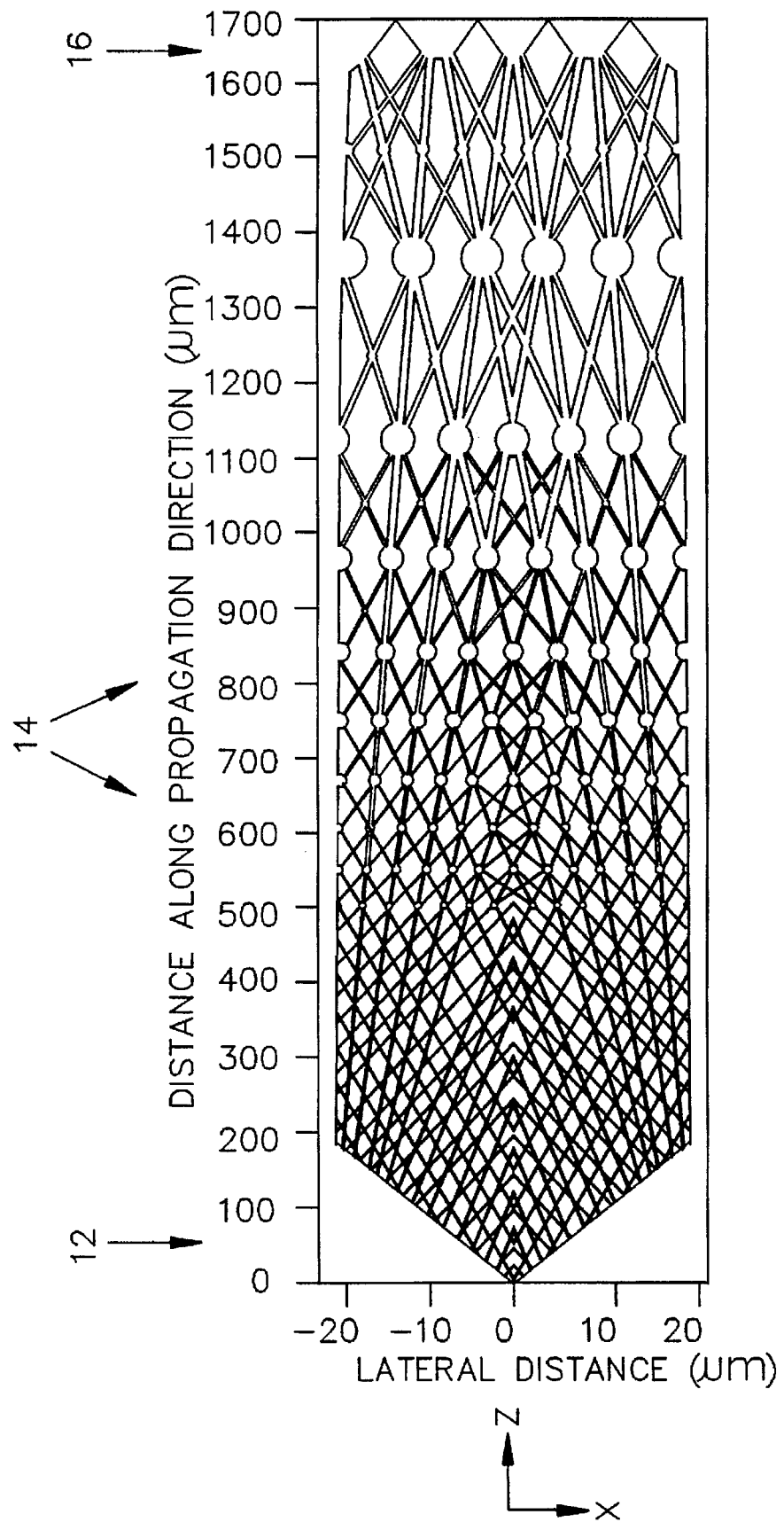
FIG. 2 is a top view of the waveguide beamsplitter of FIG. 1, illustrating the electric field evolution as it propagates through the beamsplitter.

Referring to FIG. 1, a self-imaging waveguide beamsplitter device is depicted generally as 10. A single mode input ridge waveguide 12 (single mode in both the transverse and lateral directions) symmetrically feeds a multimode propagation (MMP) region 14 (single mode in the transverse direction and multimode in the lateral direction only), in turn connected to a single mode output ridge waveguide array 16. The electric field evolution as it propagates through device 10 is depicted in FIG. 2, with reference numerals 12, 14 and 16 pointing to the electric field in the input ridge waveguide 12, the multimode propagation region 14, and the output ridge waveguide array 16, respectively.

The input ridge waveguide 12 excites the multiple lateral modes supported by the multimode propagation region 14. Since these lateral modes travel with distinctly different phase velocities, the modes become dephased. If the sidewalls of the multimode region are highly reflecting, the diverging beam from the single mode input ridge waveguide 12 will form an interference pattern within the multimode region. This pattern results in the formation of multiple self-images of the input spot along the length of the multimode region. Self-images of the input waveguide form when the superposition of the modes in the image plane matches the original modal distribution in the input plane. This condition occurs at planes where the accumulated phase differences among the excited modes are integral multiples of $2\pi$, which allows the excited modes to constructively interfere and reproduce the input's modal distribution. For a given width W of the multimode region, N images of the input spot are formed at a distance from the single mode input of $$L=(n*W^2)/(N*\lambda_0),$$

where n is the mode index of the multimode region and $\lambda_0$ is the free space wavelength of light. The images at the output plane of the multimode region are equally spaced across the multimode guide with a pitch of W/N. This technique produces splitters with high accuracy and low throughput loss in a relatively short propagation length.

Referring to FIG. 1, input ridge waveguide 12 includes input guide structure 12A and input host structure 12B. A tapered region 12C is disposed between input guide structure 12A and input host structure 12B. Similarly, multimode guide structure 14A and multimode host structure 14B are provided, with tapered region 14C disposed between multimode guide structure 14A and multimode host structure 14B. Output ridge waveguide array 16 likewise includes a tapered region 16C disposed between output ridge waveguide array guide structure 16A and output ridge waveguide array host structure 16B. Surface 12D, 14D and 16D of tapered regions 12C, 14C and 16C, respectively, may be disposed vertically relative to guide structures 12A, 14A, and 16A, or, alternatively, surfaces 12D, 14D, 16D may be angularly disposed relative to guide structure 12A, 14A, 16A. In either event, the angle of surfaces 12D, 14D, 16D relative to guide structures 12A, 14A, 16A is consistent along the mode propagation direction, in this case, the z direction.

Figure 3:
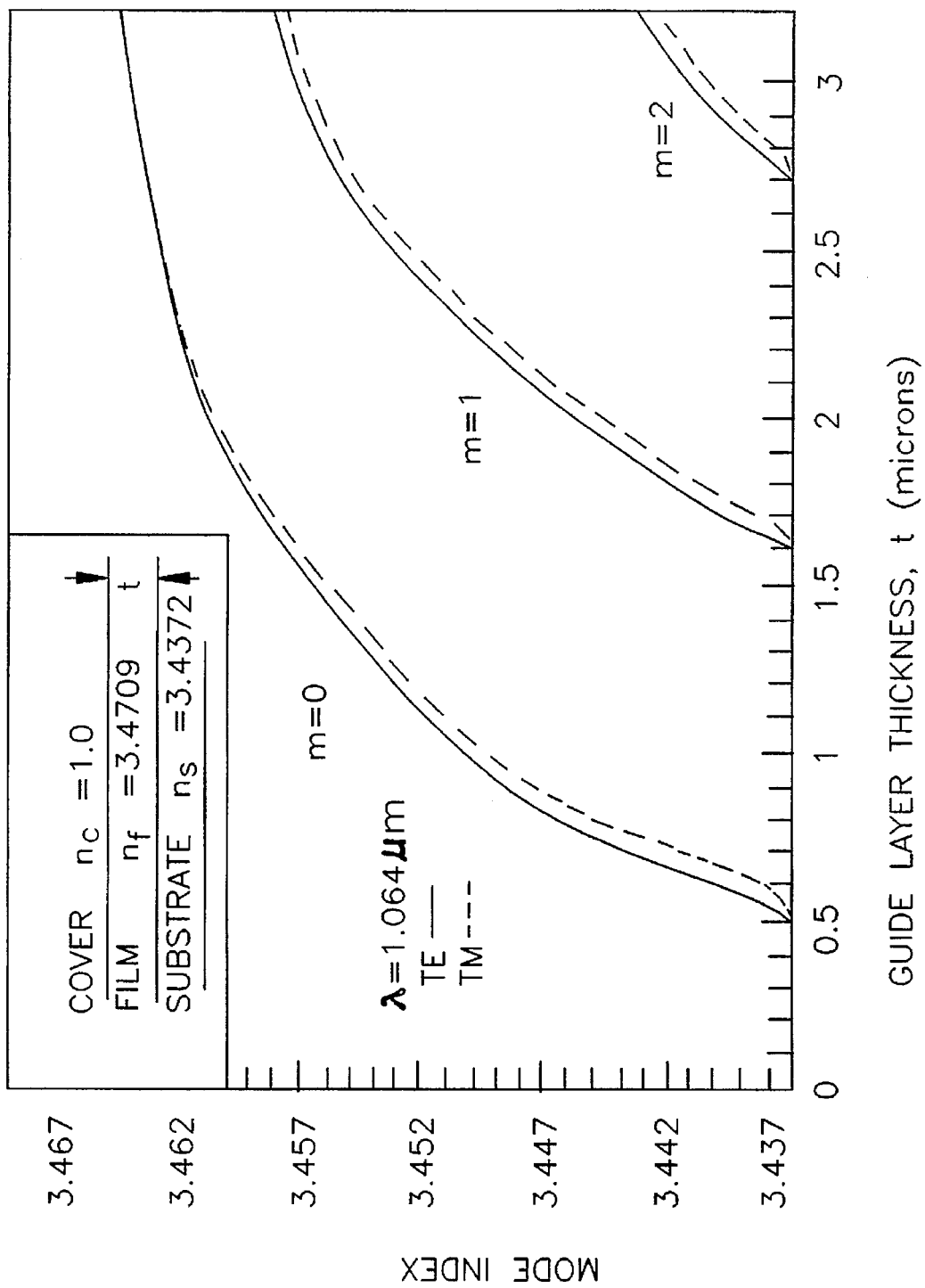
FIG. 3 is a graphical plot of the mode index versus the guide layer thickness for an asymmetric GaAs/AlGaAs slab waveguide.

The guide/host structure allows the fabrication of highly reflecting sidewalls in materials which are difficult to etch. Referring to FIG. 3, a plot of the mode index verses guide layer thickness for the asymmetric waveguide shown in the inset of the Figure. The inset shows the GaAs guide layer bounded above by air and below by $Al_{0.06}Ga_{0.94}As$. For a guide layer thickness less than the fundamental mode cutoff thickness of about 0.5 µm, no modes are supported by the guide and an "host" region is formed. For guide layer thicknesses between 0.5 and 1.6 µm, the transverse waveguide forms a "guide" region which supports a single transverse electric mode and a single transverse magnetic mode.

A mode supported in the guide region incident at the guide/host interface undergoes total internal reflection (TIR) if its angle of incidence is greater than the critical angle for TIR, $$\theta_c=\sin^{-1}(n_s/N),$$

where $n_s$ is the larger of the bulk indices of the two materials adjacent to the guide layer and N is the mode index of the guided mode. Under this condition, the incident mode is totally internally reflected regardless of the thickness of the tapered region. If the single mode ridge waveguide input to the multimode region consists of the same structure as the multimode guide, then the incidence angle to the guide/host sidewall will always be greater than the critical angle and thus be a TIR interface.

For incidence angles smaller than the critical angle, the light is unable to propagate as a guided mode in the host region and is radiated from the edge of the tapered region into the substrate. In device 10, however, the input ridge waveguide 12 that feeds the multimode propagation region 14 is constructed from the same guide/host structure as the multimode propagation region 14. The numerical aperture of the input ridge waveguide 12 defines the smallest incidence angle encountered at the multimode region's guide/host interface. Therefore, incidence angles radiated by the input ridge waveguide into the multimode region by definition meet the condition for TIR.

The guide/host structure obviates the need for etching deep vertical sidewalls through the guiding layer of the waveguide structure. The symmetric mode mixing beamsplitter concept can therefore be applied to waveguide material systems, such as lithium niobate and lithium tantalate, in which it is difficult to etch deep vertical sidewalls. Since a considerable portion of the throughput loss and mode conversion arise from scattering off sidewalls, the shallower etch depths required from the guide/host structure decrease both throughput loss and polarization cross-talk.

Figure 4:
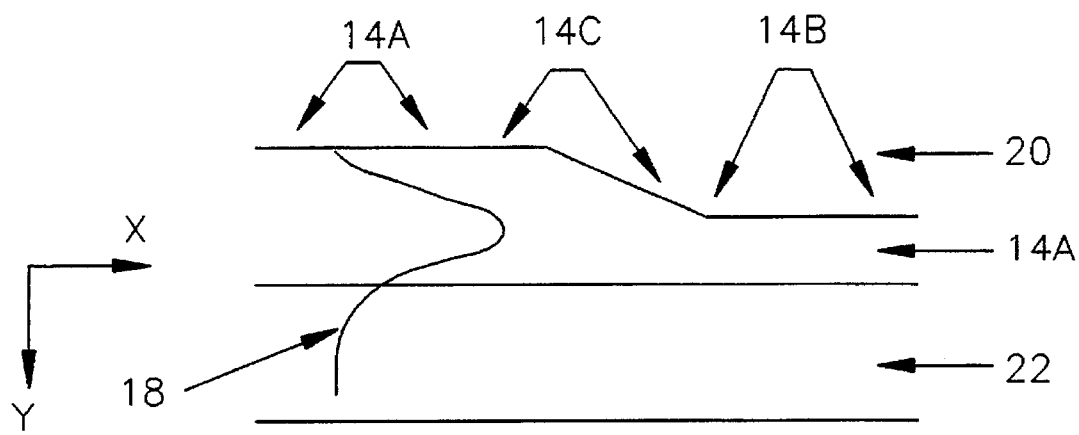
FIG. 4 is a cross-sectional view taken along lines 4—4 of FIG. 1, including a mode field distribution.
Figure 5:
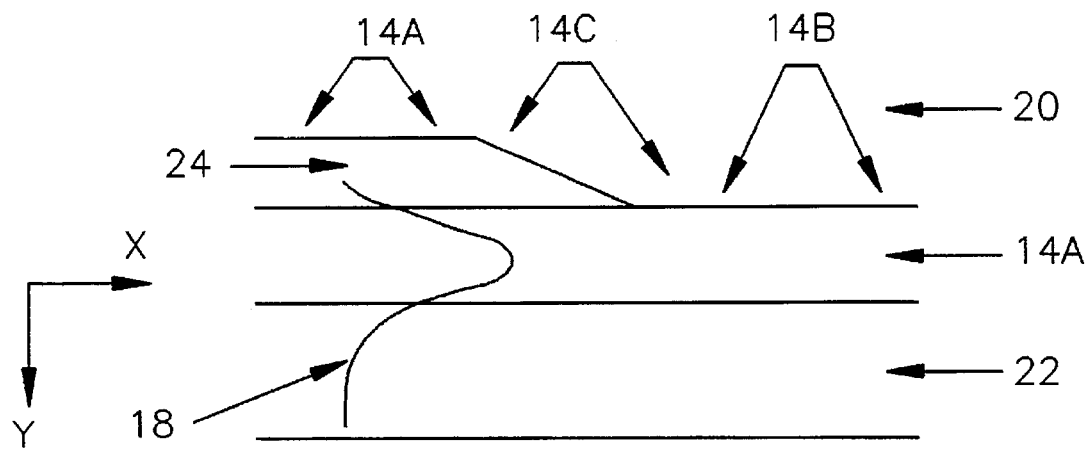
FIG. 5 is a cross-sectional view, similar to that of FIG. 4, of an alternative embodiment of the present invention, including a mode field distribution.
Figure 6:
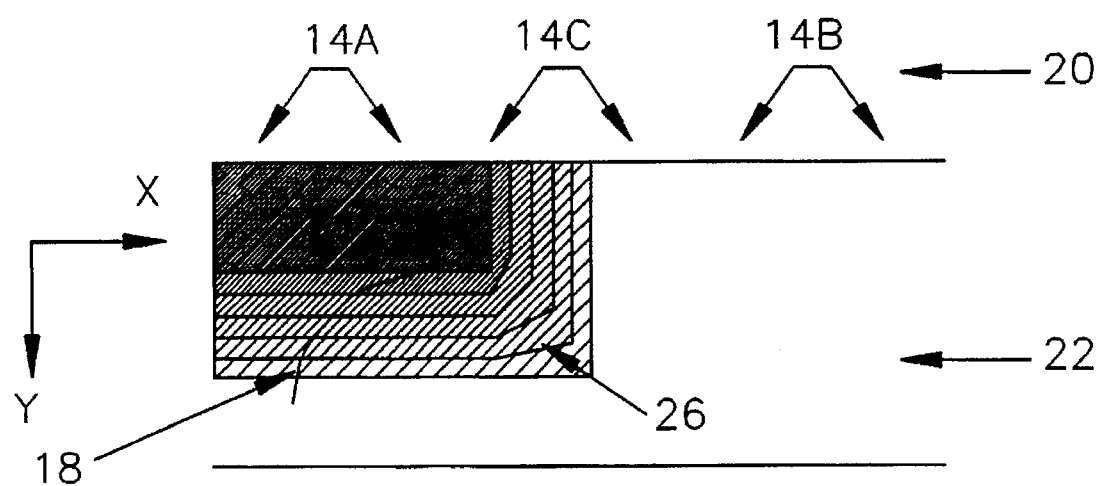
FIG. 6 is a cross-sectional view, similar to that of FIG. 4, of another embodiment of the present invention, including a mode field distribution.

A cross-sectional view on the x-y plane of the multimode propagation guide structure/host structure interface is shown in FIGS. 4, 5 and 6. In FIG. 4, the host region has been partially etched to induce the required mode index difference. Referring to FIG. 4, the mode field distribution, indicated by reference numeral 18, is shown as it varies within and between the superstrate 20, the guide layer 14A and the substrate 22. In FIG. 5, the mode index difference was produced by placing an overlay cladding 24 over the multimode propagation region 14. Again, the mode field distribution 18 is shown as it varies within and between the superstrate 20, the guide layer 14A and the substrate 22. FIG. 6 depicts the situation wherein the required mode index difference is induced by indiffusing material 26 into the waveguide to increase the mode index of the multimode propagation region 14. The mode field distribution 18 is shown as it varies within and between the superstrate 20 and the substrate 22.

Figure 7:
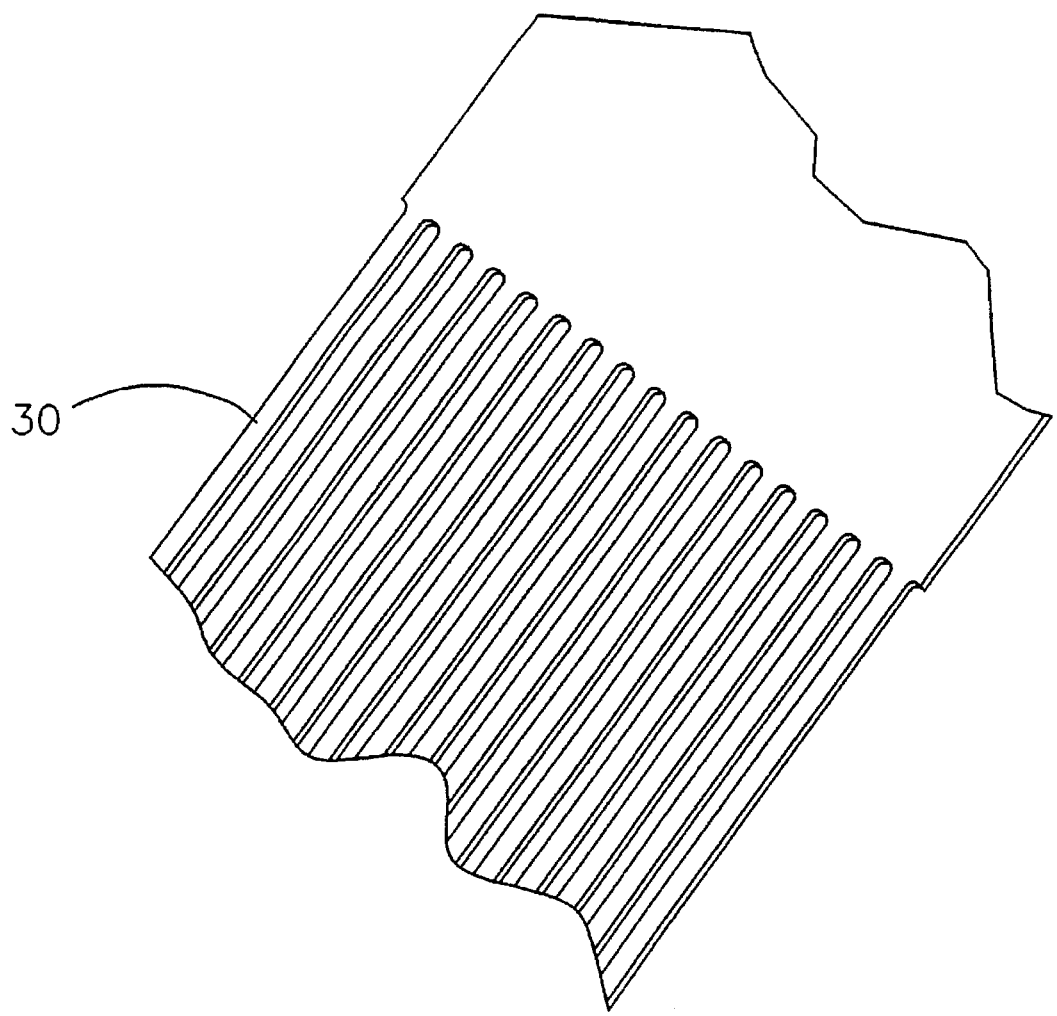
FIG. 7 is an SEM micrograph of the output rib array for a 1×16 splitter.
Figure 8:
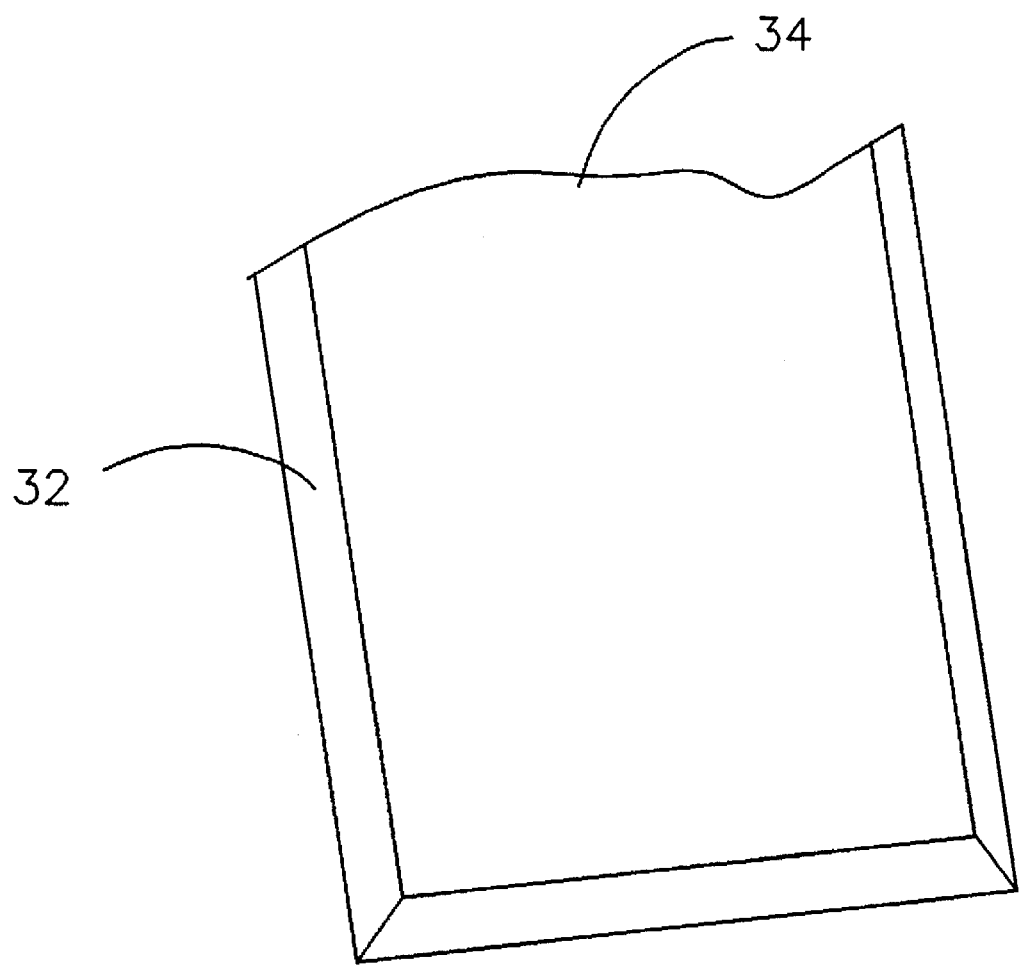
FIG. 8 depicts the sloping sidewalls of a single ridge waveguide.

Self-imaging beamsplitters were fabricated on the GaAs/AlGaAs slab waveguide structure shown in the inset of FIG. 3. The structure was grown by molecular beam apitaxy (MBE) with a lower $Al_{0.06}Ga_{0.94}As$ cladding layer thickness of 3 µm and a GaAs guide layer thickness of 1 µm. Splitters with splitting ratios ranging from 1×2 through 1×16 were designed based on the approach taught by Heaton et al. in "Novel 1-to-N Way Integrated Optical Beam Splitters Using Symmetric Mode Mixing in GaAs/AlGaAs Multimode Waveguides," *Appl. Phys. Lett.*, Vol. 61, p. 1754–56 (1992). Argon ion milling through a photoresist mask was used to define the guide/host beamsplitter structure in they slab waveguide. The output rib array 30 for a 1×16 splitter is shown in the SEM micrograph of FIG. 7. In FIG. 8 is shown the sloping sidewalls 32 of a single ridge waveguide 34. The etch depth is at the mode cut-off thickness of 0.5 µm and the sidewall slant is 54° relative to the waveguide surface.

Figure 9:
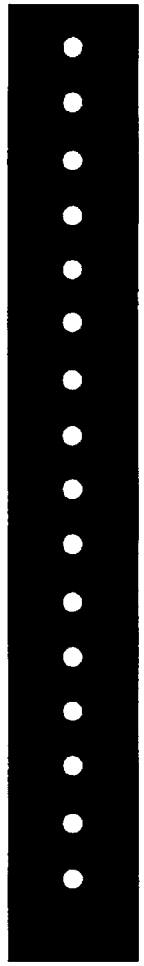
FIG. 9 is an image of the output facet positioned at the ridge waveguide array for a 1×16 splitter.
Figure 10:
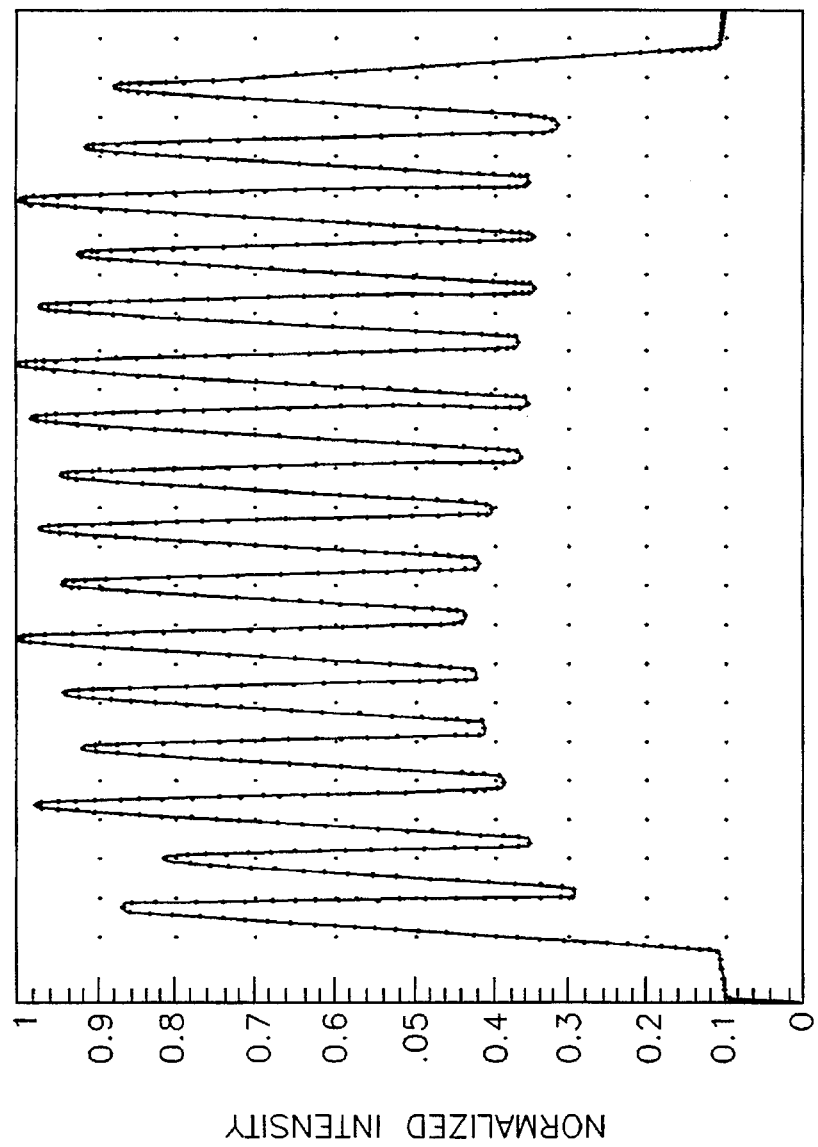
FIG. 10 is a graphical representation of the normalized intensity versus position data collected with a scanning slit detector for a 1×16 splitter with an output waveguide array.

Linearly polarized 1.064 µm light was endfire coupled with a 20× microscope objective into the input guide. The output guides were imaged first onto a CCD detector and then onto a scanning slit detector to characterize splitter uniformity. Data for a 1×16 splitter are shown in FIGS. 9 and 10. FIG. 9 is an image of the output facet positioned at the ridge waveguide array, and FIG. 10 is the normalized intensity versus position data collected with a scanning slit detector.

For the 1×16 splitters made, the splitting ratio uniformity was typically ±15.4%. The best case was ±7.8%. Polarization crosstalk for either input polarization state was typically lower than −25 dB. Device insertion loss was calibrated with respect to an adjacent ridge waveguide with typical device loss of about 3.5 dB.

Figure 11:
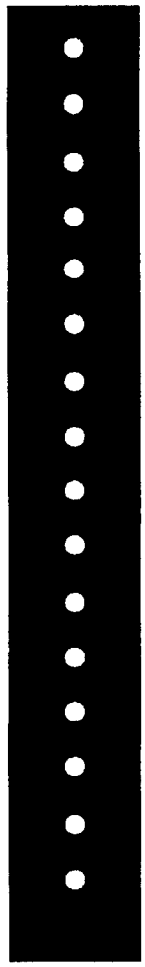
FIG. 11 is an image of the output facet positioned at the end of the multimode propagation region for a 1×16 splitter without an output waveguide array.
Figure 12:
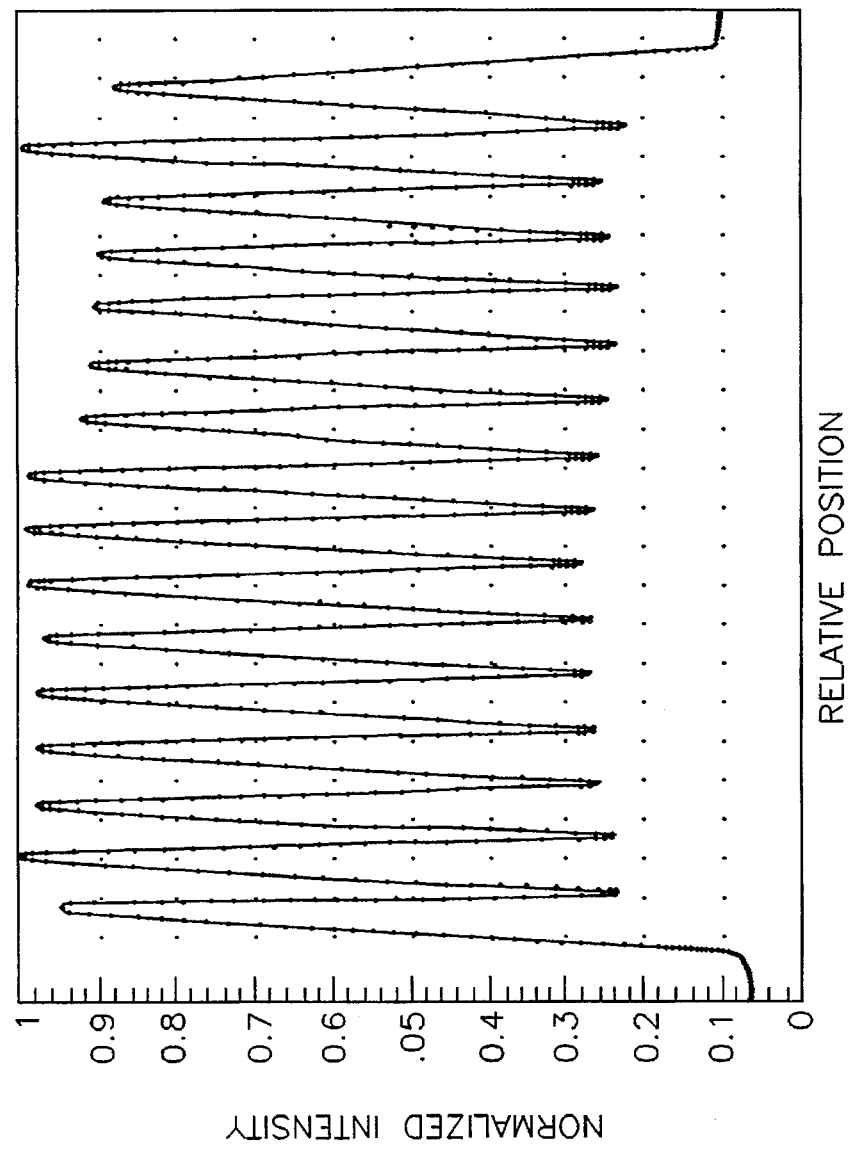
FIG. 12 is a graphical representation of the normalized intensity versus position data collected with a scanning slit detector for a 1×16 splitter without an output waveguide array.

To demonstrate that self-imaging indeed was occurring in the multimode propagation region, some devices were fabricated with no output ridge waveguide array. The output facet was positioned at the end of the multimode region. Data for a 1×16 splitter without an output waveguide is shown in FIGS. 11 and 12. Typical uniformity in this case was ±8.5% with a best case of ±5.0%. Again polarization crosstalk was down around −25 dB and the typical insertion loss was about 0.8 dB.

In the structure of the present invention, a host region is defined by etching only far enough through the film in the grown waveguide to insure that no modes are supported in the etched region. As a result of the partial etch, the advantages of this technique include ease of manufacture, low device insertion loss, low polarization crosstalk, and application to diverse waveguide material systems. The resolution, contrast, and very presence of self-imaging in waveguide beamsplitters depends on the number of lateral modes that contribute constructively to the image. This is, in turn, dependent on the degree of confinement of the lateral modes. It is well-known that the ridge waveguide structure provides adequate confinement in strip-line waveguides. The structure of the present invention provides the confinement needed for application to self-imaging beamsplitter devices.

The self-imaging effect in planar optical waveguides can be integrated with other waveguide components, such as delay lines, modulators, gratings, amplifiers, sources, and detectors, to form novel devices and architectures. The method for implementing the self-imaging effect in planar waveguides disclosed herein may be applied to structures that include, but are not limited to, 1×N beamsplitters, N×M spot array generators, wavelength division multiplexing (WDM) source arrays and demultiplexers, code division multiple access (CDMA) multiplexers and demultiplexers, and waveguide sensor arrays.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. An optical self-imaging waveguide device comprising:
   an input waveguide including an input guide structure and an input host structure forming an input guide/host interface;
   a multimode propagation region including a multimode guide structure and a multimode host structure forming a multimode guide/host interface;
   an output waveguide array including an output guide structure and an output host structure forming an output guide/host interface;

a tapered region including a tapered profile being formed between each of said guide structures and said host structures;

wherein said input waveguide and said multimode propagation region are constructed from a same transverse waveguide structure and said tapered profile is constant along a mode propagation direction to result in total internal reflection at said interfaces; and wherein said guide structures include a mode index greater than the mode index of said host structures forming an induced mode index difference.

2. The device of claim 1, wherein said input waveguide is single mode in both the transverse and lateral directions.

3. The device of claim 1, wherein said output waveguide array is single mode in both the transverse and lateral directions.

4. The device of claim 1, wherein said multimode propagation region is single mode in the transverse direction and multimode in the lateral direction only.

5. The device of claim 1, wherein said induced mode index difference is formed by partially etching the host structures.

6. The device of claim 1, wherein said induced mode index difference is formed by overlay clad loading said guide structures.

7. The device of claim 1, wherein said induced mode index difference is formed by indiffusion of said guide structures and/or said host structures.

8. The device of claim 1, wherein said induced mode index difference is formed by ion exchange of said guide structures and/or said host structures.

9. The device of claim 1, wherein said device is formed of a lithium niobate material.

10. The device of claim 1, wherein said device is formed of a lithium tantalate or lithium tantalate-based material.

11. The device of claim 1, wherein said device is formed of a polymer-based material.

12. The device of claim 1, wherein said device is formed of a galium arsenide or galium arsenide-based material.

13. The device of claim 1, wherein the device is formed of a indium phosphide or indium phosphide-based material.

14. The device of claim 1, wherein the device is formed of a glass material.

15. The device of claim 1, wherein the device is formed of a silica-based material.

16. The device of claim 1, wherein the input waveguide symmetrically feeds the multimode propagation region.

17. A method of manufacturing an optical self-imaging waveguide device comprising:

forming a device including a single mode input symmetrically feeding a multimode propagation region followed by an output waveguide array, each of the input waveguide, the multimode propagation region and the output waveguide array including a guide structure and a host structure and a tapered region being formed between each of the guide structures and the host structures; and inducing a mode index difference between the mode index of the multimode guide structure and the mode index of the multimode host structure.

18. The method of claim 17, wherein the step of inducing a mode index difference comprises partially etching the host structures.

19. The method of claim 17, wherein the step of inducing a mode index difference comprises overlay clad loading of the guide structures.

20. The method of claim 17, wherein the step of inducing a mode index difference comprises indiffusion of the guide structures and/or the host structures.

21. The method of claim 17, wherein the step of inducing a mode index difference comprises ion exchange of the guide structures and/or the host structures.

* * * * *